(12) United States Patent
Jurado et al.

(10) Patent No.: US 7,585,244 B2
(45) Date of Patent: Sep. 8, 2009

(54) SUN PINION COVER

(75) Inventors: Augusto Xavier Jurado, Erie, PA (US); Richard E. Rzepka, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/056,989

(22) Filed: Feb. 11, 2005

(65) Prior Publication Data

US 2005/0250611 A1 Nov. 10, 2005

Related U.S. Application Data

(60) Provisional application No. 60/568,377, filed on May 5, 2004.

(51) Int. Cl.
*F16H 57/04* (2006.01)

(52) U.S. Cl. ............... 475/159; 74/467; 74/606 R; 184/6.12

(58) Field of Classification Search ............ 475/159, 475/160; 74/467, 606 R; 184/6.12, 6.21, 184/6.22; 180/372
See application file for complete search history.

(56) References Cited

U.S. PATENT DOCUMENTS

| | | | | |
|---|---|---|---|---|
| 2,717,673 A * | 9/1955 | Zeidler | ............ | 192/3.3 |
| 2,939,344 A * | 6/1960 | Harris | ............ | 475/159 |
| 3,131,582 A * | 5/1964 | Kelbel | ............ | 475/136 |
| 3,475,992 A * | 11/1969 | West, Jr. et al. | ............ | 475/146 |
| 4,573,373 A * | 3/1986 | Shimizu et al. | ............ | 74/468 |
| 5,467,667 A * | 11/1995 | Zaiser et al. | ............ | 74/606 R |
| 5,472,383 A * | 12/1995 | McKibbin | ............ | 475/159 |
| 5,910,063 A * | 6/1999 | Kato | ............ | 475/159 |
| 7,022,039 B2 * | 4/2006 | Hasegawa et al. | ............ | 475/159 |
| 2006/0063630 A1 * | 3/2006 | Jurado | ............ | 475/159 |

* cited by examiner

*Primary Examiner*—David D. Le
(74) *Attorney, Agent, or Firm*—GE Global Patent Operation

(57) ABSTRACT

A sun pinion cover for an electric motor driven, off-highway vehicle transmission is provided wherein the transmission defines a hub assembly cavity and a transmission opening and wherein the transmission includes a reduction gear set having a low-speed pinion and at least one low-speed planet, wherein the reduction gear set is disposed adjacent the transmission opening. The sun pinion cover includes a cover body which defines a first lubricant port, a second lubricant port and a lubricant conduction channel which communicates the first lubricant port with the second lubricant port, such that when the cover body is attached to the transmission, the first lubricant port is disposed adjacent the low-speed pinion and the low-speed planet and the second lubricant port is disposed adjacent the hub assembly cavity to allow for a lubricant flow between the low-speed pinion, the low-speed planet and the hub assembly cavity.

17 Claims, 8 Drawing Sheets

SUN PINION COVER

RELATED APPLICATIONS

The present application claims priority of U.S. Provisional Patent Application Ser. No. 60/568,377 filed May 5, 2004, the contents of which are incorporated herein by reference in its entirety.

FIELD OF THE INVENTION

The present invention relates generally to the lubrication of a transmission and more particularly to an improved lubrication sun pinion cover for an electric mining truck transmission.

BACKGROUND OF THE INVENTION

Large off-road, heavy-duty work vehicles, such as mining vehicles used to haul heavy payloads excavated from open pit mines, are well known and usually employ motorized wheels for propelling or retarding the vehicle in an energy efficient manner. This type of vehicle is shown in FIG. 1. This efficiency is typically accomplished by employing a large horsepower diesel engine in conjunction with an alternator and a main traction inverter. The diesel engine is directly associated with the alternator such that the diesel engine drives the alternator. The alternator is used to power the main traction inverter, wherein the main traction inverter supplies power having a controlled voltage and frequency to two drive or traction motors connected to the rear wheels of the vehicle. The motors may be either AC or DC operated. As each drive motor is operated, the drive motor causes a transmission drive shaft to rotate at a low torque and high speed about the drive shaft axis. Because the transmission drive shaft is directly associated with the vehicle transmission, the low torque high speed rotational energy of the transmission drive shaft is communicated to the vehicle transmission. The vehicle transmission then takes the low torque high speed rotational energy supplied by the transmission drive shaft and converts this energy into a high torque low speed rotational energy output which is supplied to the rear wheels.

Referring to FIG. 2, the conversion of this low torque high speed rotational energy into a high torque low speed rotational energy is typically accomplished using a double reduction gear set disposed within the vehicle transmission. A double reduction gear set is a series of gears, pinions and planets that includes a first reduction stage and a second reduction stage. The first reduction stage may include a high-speed sun pinion, a plurality of high-speed planets and a stationary ring gear and the second reduction stage may include a low-speed sun pinion, a plurality of low-speed planets and a stationary ring gear. The output of the first reduction stage is connected to the input of the second reduction stage and may be referred to as the high-speed carrier. In a similar manner, the output of the second reduction stage is connected to the vehicle wheels via a torque tube/hub assembly. Inward and outward thrust washers on the low-speed pinion enable rotation of the low-speed pinion relative to the high-speed pinion and the transmission housing.

As described above, a transmission of this type includes a plurality of moving parts that interact and mesh with each other in order to convert the low torque high-speed energy into high torque low-speed energy. As such, it is essential to keep all of the parts of the transmission well lubricated to avoid undue wear and equipment failure. Currently, the components within the transmission are lubricated using a "splash" process. This "splash" process involves partially filling the torque tube/hub assembly with oil such that the lubrication is distributed to the transmission components during movement of the high-speed carrier, the low-speed carrier, the high-speed planets and the low-speed planets. As these components move, the lubricating oil contained within the torque tube that has adhered to these components splashes from the carriers onto the components contained in the transmission, such as the low-speed sun pinion. As the low-speed sun pinion and the high-speed planets mesh together, the oil that adheres to both gears during the "splash" process gets squeezed out of the mesh in the axial direction of the transmission, providing lubrication to additional parts of the transmission. This provides lubrication to the radial outer surfaces of the thrust washers, but not to the radial inner surfaces.

Although the above lubrication process provides for sufficient lubrication of all of the internal parts of the transmission, including key wear components, any additional oil flow to critical areas of the transmission would be advantageous and may provide an additional margin of safety for those wheels that may be subjected to additional loads due to application and/or working environment. This additional margin of safety is desirable as an additional precaution to prevent the need for frequent replacement of equipment parts and/or catastrophic failure of the equipment.

SUMMARY OF THE INVENTION

A sun pinion cover for a motorized wheel off-highway vehicle transmission is provided, wherein the vehicle transmission includes a high-speed pinion and high-speed planets positioned around the pinion at an inward side of the transmission. The vehicle transmission further includes a low-speed pinion and low-speed planets positioned around the low-speed pinion at an outward side of the transmission and a transmission housing which defines a transmission cavity for receiving the pinions and planets and a transmission opening disposed at a longitudinal axis of the transmission at an outward end of the transmission housing for enabling access to the pinions and planets. The low-speed pinion is of generally tubular construction and defines a central passage therein, wherein the low-speed pinion includes an inward thrust washer at one end toward the high-speed pinion and an outward thrust washer toward the transmission opening. The sun pinion cover includes a cover body structure detachably secured to the transmission housing for covering the transmission opening at the longitudinal axis of the transmission. The cover body structure defines a lubricant duct which extends in a generally radial direction with respect to the longitudinal axis of the transmission and presents a first lubricant inlet port at an inner surface of the cover and a second lubricant outlet duct at the inner surface of the cover, with the duct enabling lubricant flow from the first inlet port to the second outlet port, the first lubricant inlet port being positioned adjacent the low-speed planets in the transmission cavity to receive lubricant expelled by the planets and the second lubricant outlet port being disposed adjacent the low-speed pinion central passage for flow of lubricant from the transmission cavity to the central passage of the pinion for distributing lubricant to the inward and outward thrust washers on the low-speed pinion.

A transmission assembly for an electric motor driven, off-highway vehicle is provided and includes a transmission housing, wherein the transmission housing defines a transmission cavity and a transmission opening, wherein the transmission opening is communicated with the transmission cavity. A reduction gear set is also provided, wherein the reduction gear set includes a low-speed pinion which defines a pinion cavity, the low-speed pinion being disposed within the transmission cavity to be adjacent the transmission opening. Additionally, a sun pinion cover is provided, wherein the sun pinion cover includes a cover body structure which defines a first lubricant opening, a second lubricant opening and a lubricant conduction channel, wherein the lubricant conduction channel communicates the first lubricant opening with the second lubricant opening and wherein the sun pinion cover is associated with the transmission housing such that the sun pinion cover is disposed over the transmission opening and such that the first lubricant opening is communicated with the transmission cavity and such that the second lubricant opening is communicated with the pinion cavity.

A sun pinion cover for an electric-motor driven, off-highway vehicle transmission is provided and includes a low-speed pinion and a transmission housing structure defining a transmission opening that is communicated with a transmission cavity, wherein the low-speed pinion is disposed within the transmission cavity and defines a pinion cavity. The sun pinion cover includes a cover body structure, where the cover body structure includes a cover inner surface and defines at least one lubricant conduction channel. The cover inner surface defines a plurality of channel openings communicated with each other via the at least one lubricant conduction channel and wherein when the sun pinion cover is associated with the transmission housing, the plurality of channel openings are disposed to communicate the transmission cavity with the pinion cavity to allow for a lubricant flow between the transmission cavity and the pinion cavity.

A method for increasing lubricant flow within an electric-motor driven, off-highway vehicle transmission is provided, wherein the transmission includes a low-speed pinion and a transmission housing structure which defines a transmission opening communicated with a transmission cavity, wherein the low-speed pinion defines a pinion cavity and is disposed within the transmission cavity. The method includes creating a lubricant conduction path between the transmission cavity and the pinion cavity and operating the electric-motor driven, off-highway vehicle transmission to cause a lubricant to flow between the transmission cavity and the pinion cavity via the lubricant conduction path.

BRIEF DESCRIPTION OF THE DRAWING FIGURES

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

Figure 1:
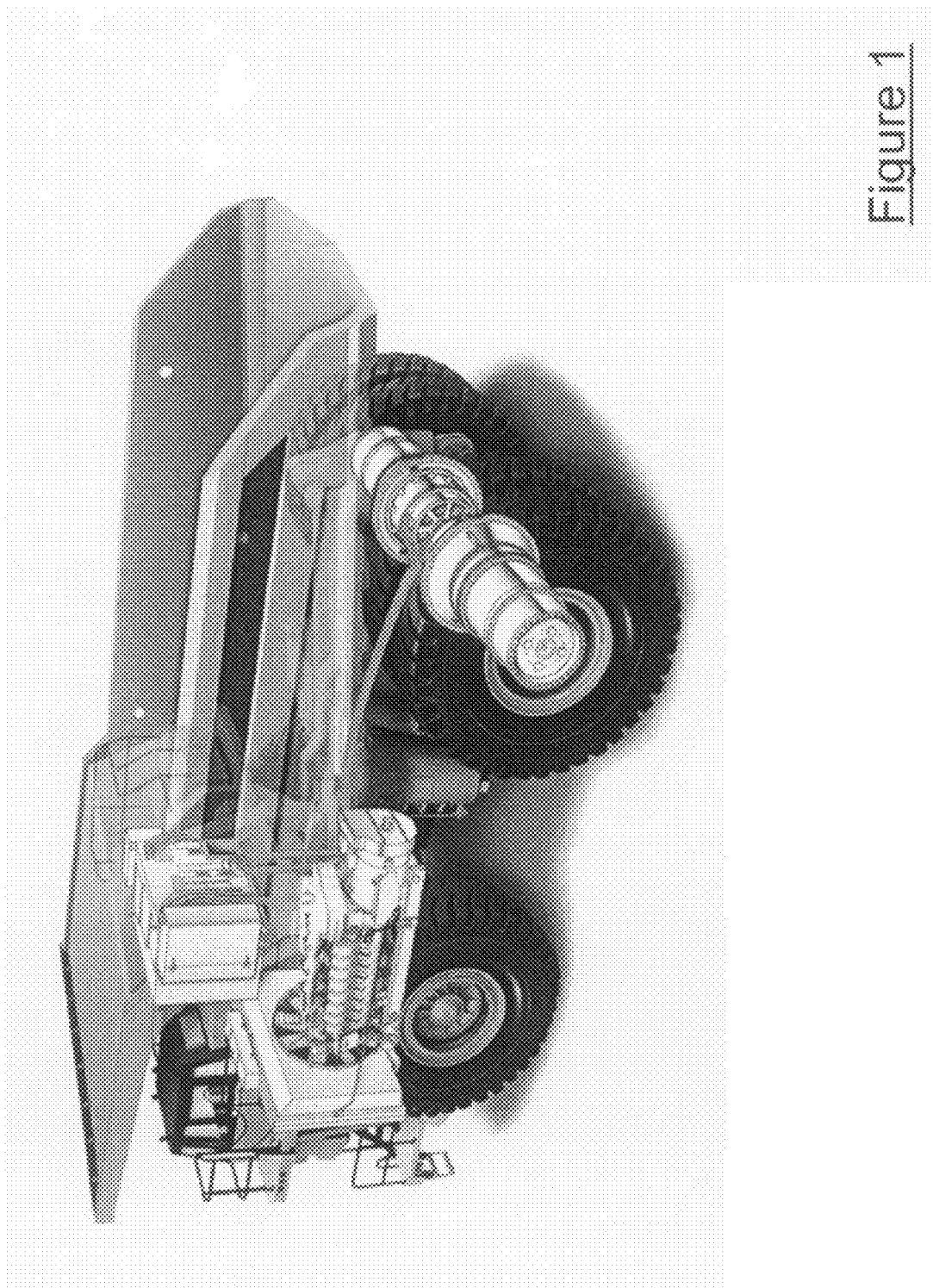
FIG. 1 is a side perspective view of an off-road, heavy-duty work vehicle of the type that uses an AC transmission.
Figure 2:
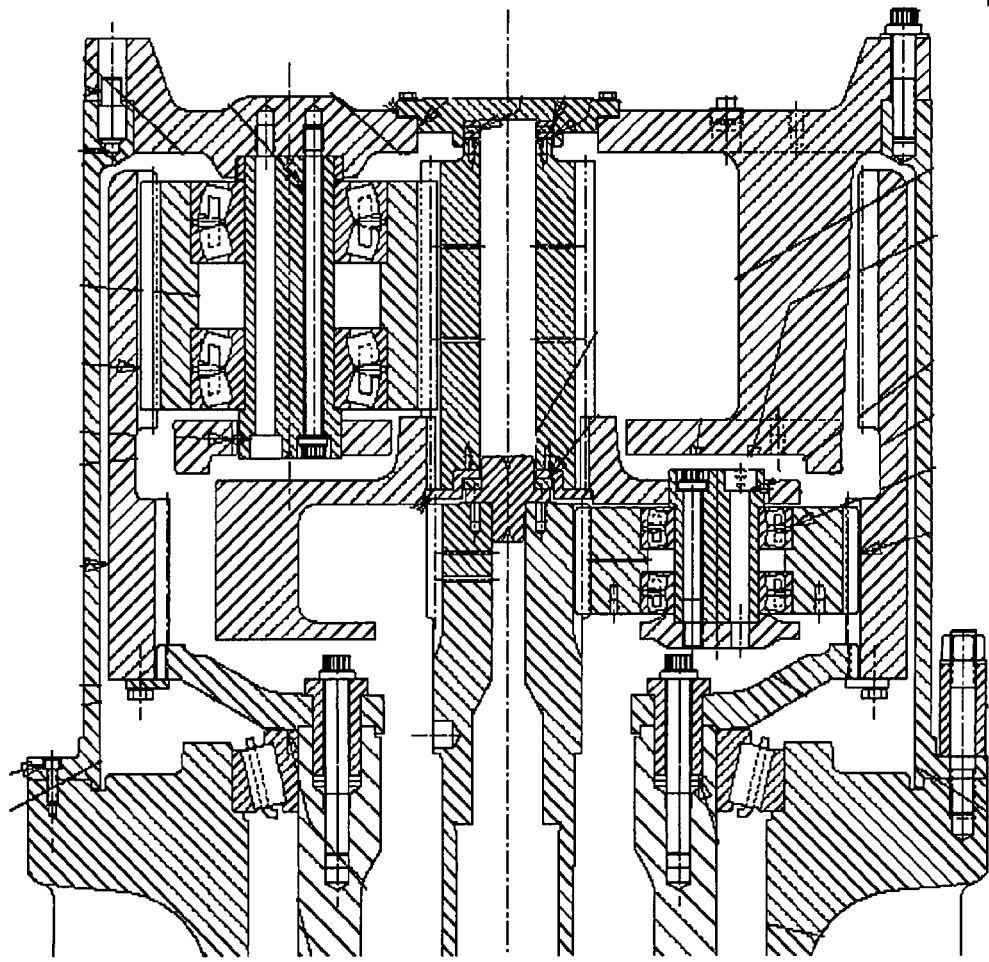
FIG. 2 is a cross sectional side view of a transmission having a sun pinion cover, in accordance with the prior art.
Figure 3:
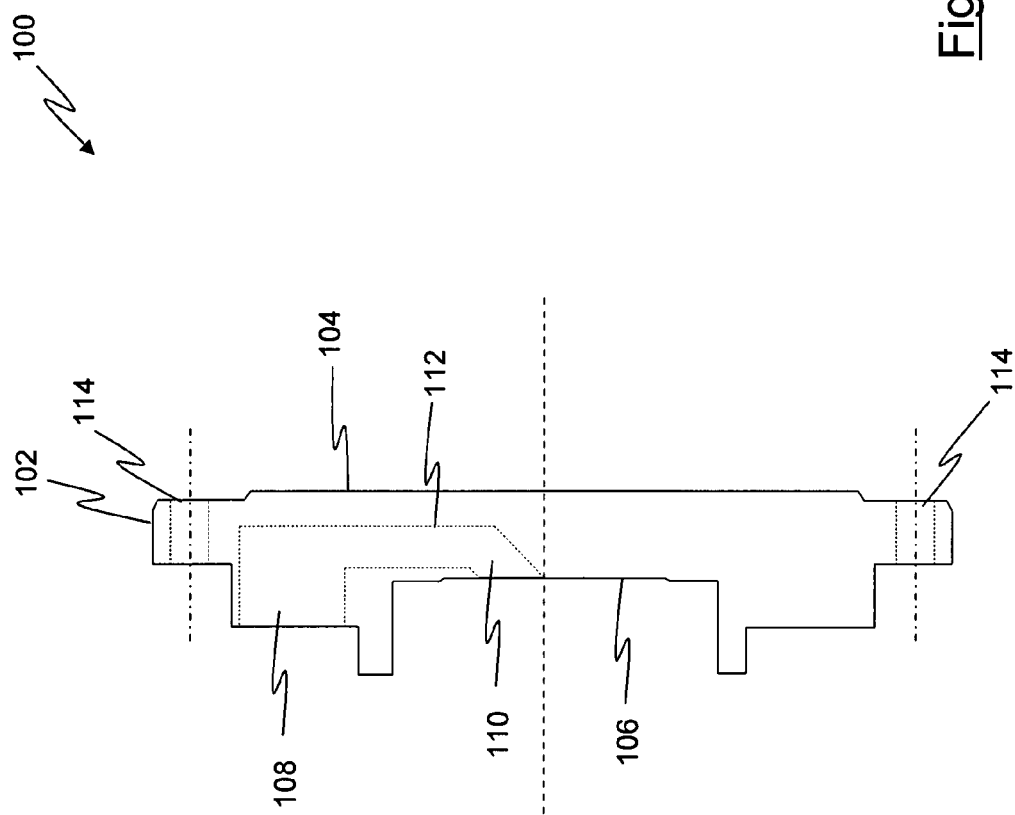
FIG. 3 is a cross sectional side view of a sun pinion cover, in accordance with a preferred embodiment.

Referring to FIG. 3, a sun pinion cover 100 is illustrated and includes a cover body structure 102 having a cover outer surface 104 and a cover inner surface 106. Cover inner surface 106 defines a lubricant inlet port 108 and a lubricant outlet port 110, wherein lubricant inlet port 108 is communicated with lubricant outlet port 110 via a lubricant conduction channel 112. Sun pinion cover 100 also defines at least one suitable fastener engagement hole, such as a bolt hole, 114 disposed to allow sun pinion cover 100 to be detachably secured to a transmission assembly hub via a connection device, such as a bolt 115. It should be further appreciated that the sun pinion cover 100 may also be detachably, sealingly and securely connected to the transmission assembly hub via a clip, a snap, a clamp or an adhesive.

Figure 4:
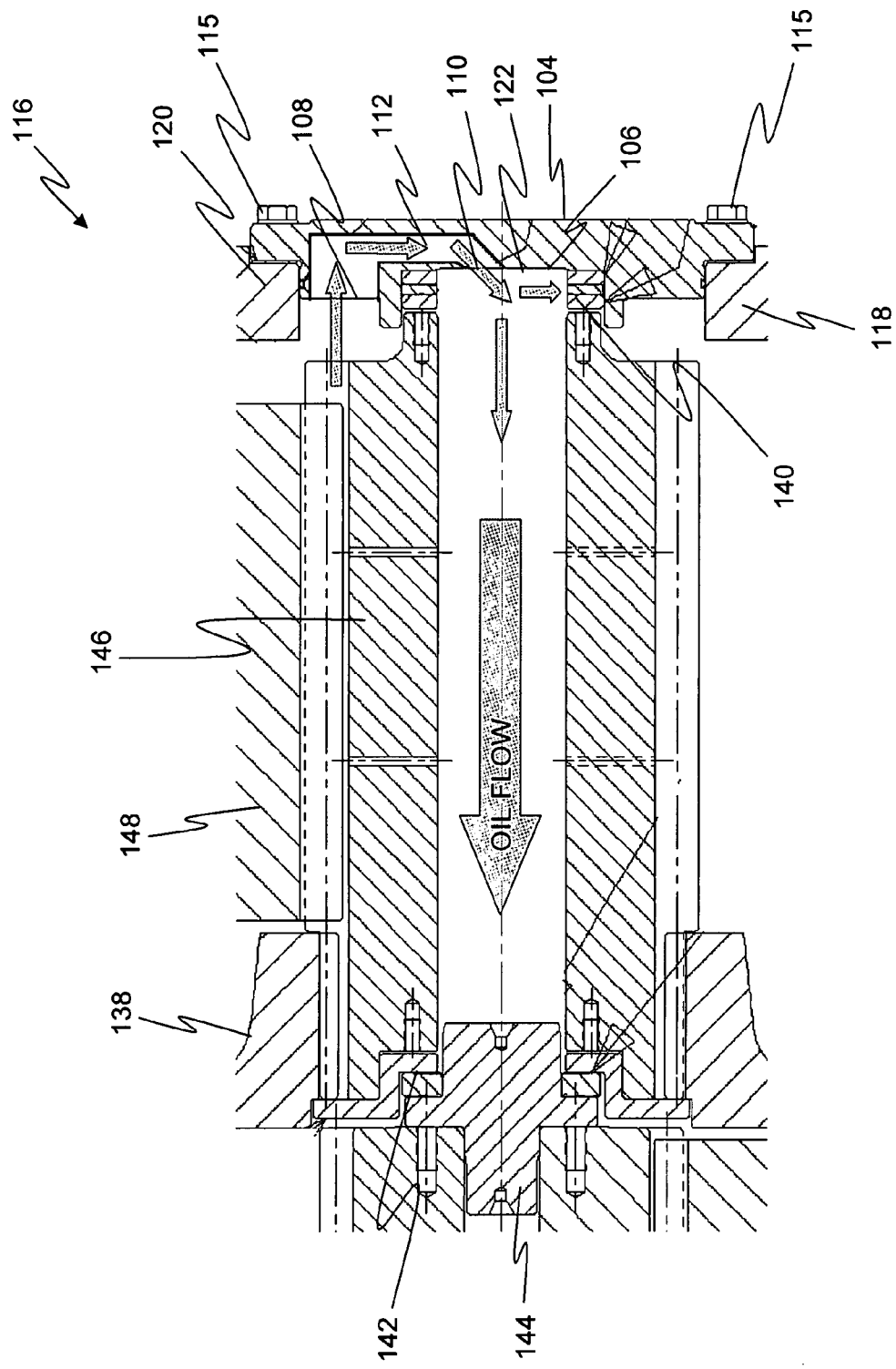
FIG. 4 is a side cutout view of a transmission employing the sun pinion cover of FIG. 3.
Figure 5:
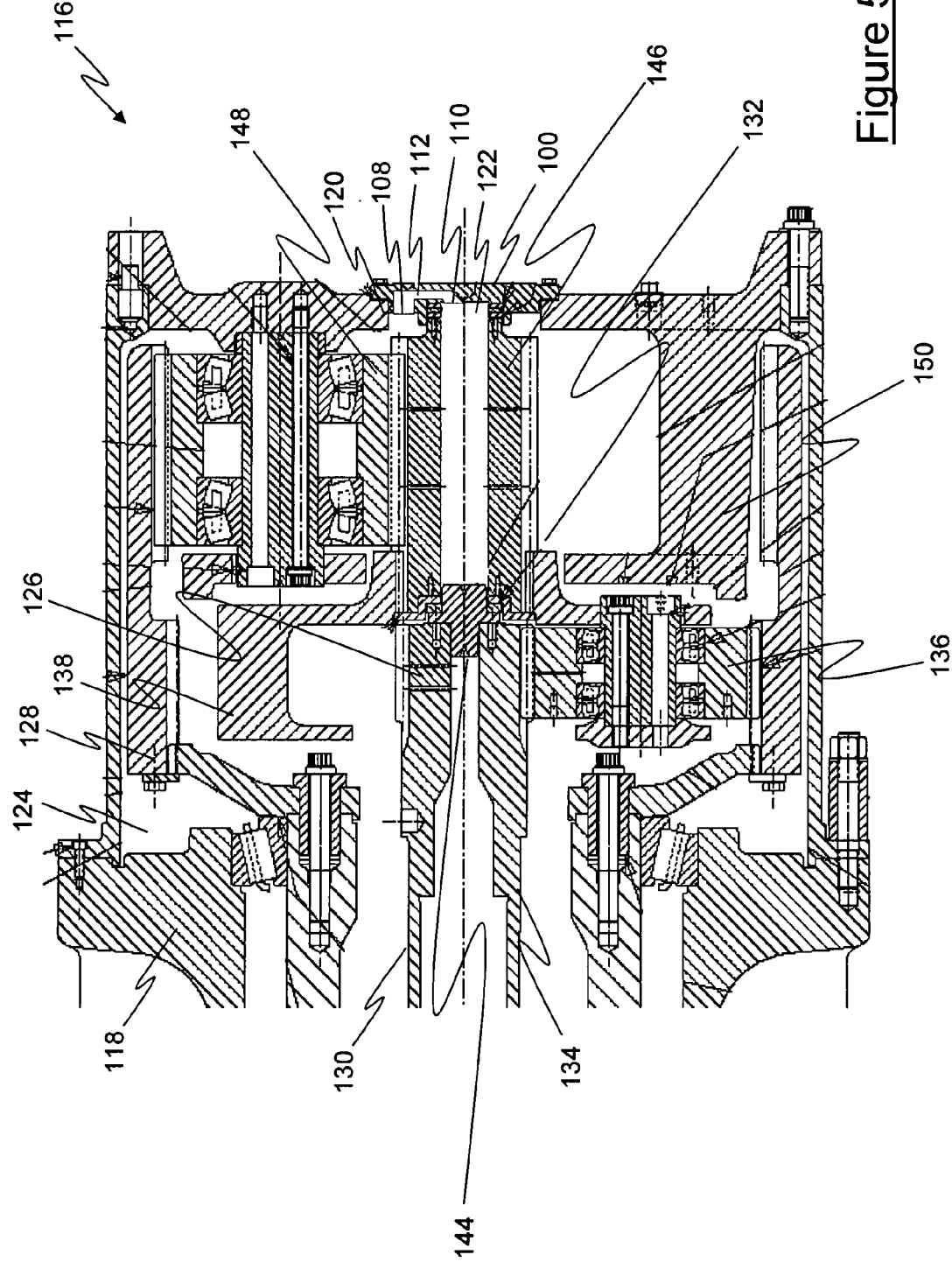
FIG. 5 is a side cutout view of a Transmission employing the sun pinion cover of FIG. 3.

Referring to FIG. 4 and FIG. 5, a sun pinion cover 100 is shown detachably secured with a transmission 116. Transmission 116 includes a hub assembly 118, which defines at least one hub mounting cavity 120, a transmission opening 122 and a hub assembly cavity 124, wherein transmission opening 122 is communicated with hub assembly cavity 124. Transmission 116 also includes a double reduction gear set 126 disposed within hub assembly cavity 124, wherein double reduction gear set 126 includes a stationary ring gear 128, a first reduction stage 130 and a second reduction stage 132. First reduction stage 130 includes a high-speed sun pinion 134, a plurality of high-speed planets 136 and a high-speed carrier 138, wherein high-speed carrier 138 transmits the output of first reduction stage 130 to second reduction stage 132. High-speed carrier 138 is disposed within transmission 116 such that its axial motion is restrained by an outboard thrust washer 140 riding on the cover inner surface 106 and an inboard thrust washer 142 riding on a plug 144.

Second reduction stage 132 includes a low-speed sun pinion 146, a plurality of low-speed planets 148 and a low-speed carrier 150, wherein low-speed sun pinion 146 is the input to second reduction stage 132 and receives the output of first reduction stage 130 from high-speed carrier 138. Low-speed carrier 150 receives the output of second reduction stage 132 and transmits this high torque output to the vehicle wheels. Sun pinion cover 100 is shown non-movably associated with hub assembly 118 via at least one mounting device 152 such that sun pinion cover 100 is disposed over transmission opening 122 to sealingly enclose hub assembly cavity 124. Moreover, sun pinion cover 100 is disposed relative to hub assembly 118 such that lubricant inlet port 108 is adjacent the plurality of low-speed planets 148 and such that lubricant outlet port 110 is adjacent low-speed sun pinion 146. This allows lubricant to flow between plurality of low-speed planets 148 and low-speed sun pinion 146 via lubricant conduction channel 112. The cover 100 may include two or more channels 112 at spaced intervals around the cover 100. While channel 112 is shown as being spaced from the inner surface 106 of the cover 100 to present a passage open only at ends of inlet 108 and outlet 110, the channel may alternatively be formed as a recess in the inner surface 106 of the cover 100 extending between the inlet 108 and the outlet 110.

Figure 6:
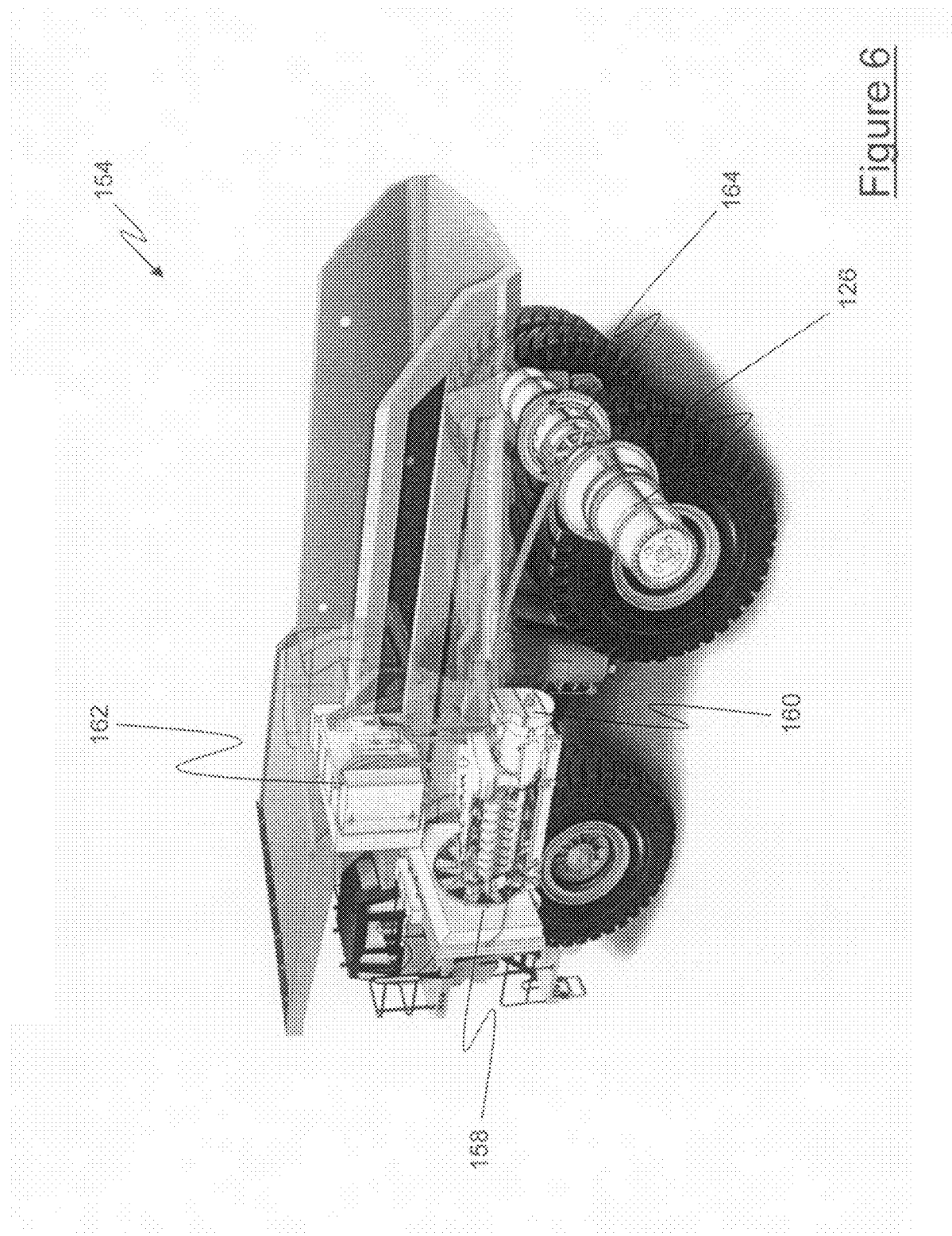
FIG. 6 is an additional side perspective view of an off-road, heavy-duty work vehicle of the type that uses a transmission.

Referring to FIG. 4, FIG. 5 and FIG. 6, an off-road, heavy-duty work vehicle 154 is shown and includes a large horsepower diesel engine 158 coupled to an alternator 160, a main traction inverter 162, at least one AC drive motor 164 and a transmission drive shaft 166. As the vehicle 154 is operated, diesel engine 158 drives alternator 160 to power main traction inverter 162. Main traction inverter 162 supplies power to AC drive motor 164, wherein main traction inverter 162 controls the voltage and frequency of the power supplied to AC drive motor 164. AC drive motor 164 converts this electrical energy into mechanical energy by causing transmission drive shaft 166 to rotate in relation to the power supplied to AC drive motor 164. The rotation of transmission drive shaft 166, which communicates AC drive motor 164 with high-speed sun pinion 134, transfers the mechanical energy from AC drive motor 164 to AC transmission 116.

As briefly discussed above, high-speed sun pinion 134 is part of first reduction stage 130. As such, because the rotation of transmission drive shaft 166 causes high-speed sun pinion 134 to rotate, the high-speed low torque mechanical energy from AC drive motor 164 is transferred into first reduction stage 130 via high-speed sun pinion 134. This high-speed low torque rotational energy is converted into lower-speed higher torque energy via first reduction stage 130 and transferred to second reduction stage 132 via low-speed sun pinion 146. The converted energy from first reduction stage 130 is converted further into low-speed high torque energy via second reduction stage 132. At this point, the low-speed high torque energy is transferred to the vehicle wheels via low-speed carrier 150. As the high-speed low torque energy received by AC transmission 116 is being converted into low-speed high torque energy, the components within AC transmission 116 are rapidly moving and interacting with each other.

When low-speed sun pinion 146 and low-speed planets 148 interact and mesh together, the lubricant that adheres to low-speed sun pinion 146 and low-speed planets 148 is compressed out of the mesh in the axial direction toward sun pinion cover 100. Because lubricant inlet port 108 is adjacent low-speed planets 148, the meshing of the low-speed planets and the sun-pinion provides a pumping action for directing lubricant into lubricant inlet port 108, through lubricant duct 112, out of lubricant outlet port 110 and into the central passage of low-speed sun pinion 146. This provides a continuous lubricant flow through the central passage of low-speed sun pinion 146 thus providing lubrication to outboard thrust washer 140 and inboard thrust washer 142. Lubricant flow to the inward and outward thrust washers thereby assures lubrication at the radial inner surfaces of these critical wear components for extending their useful lives.

Figure 7:
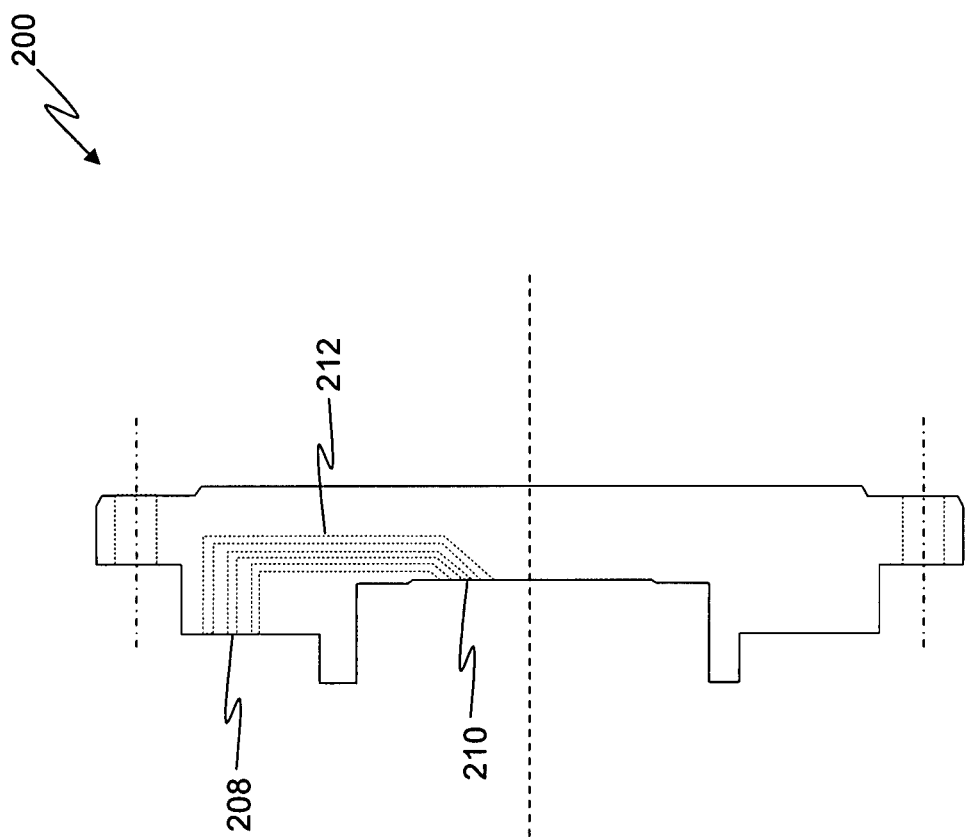
FIG. 7 is a cross sectional side view of a sun pinion cover, in accordance with a second embodiment.
Figure 8:
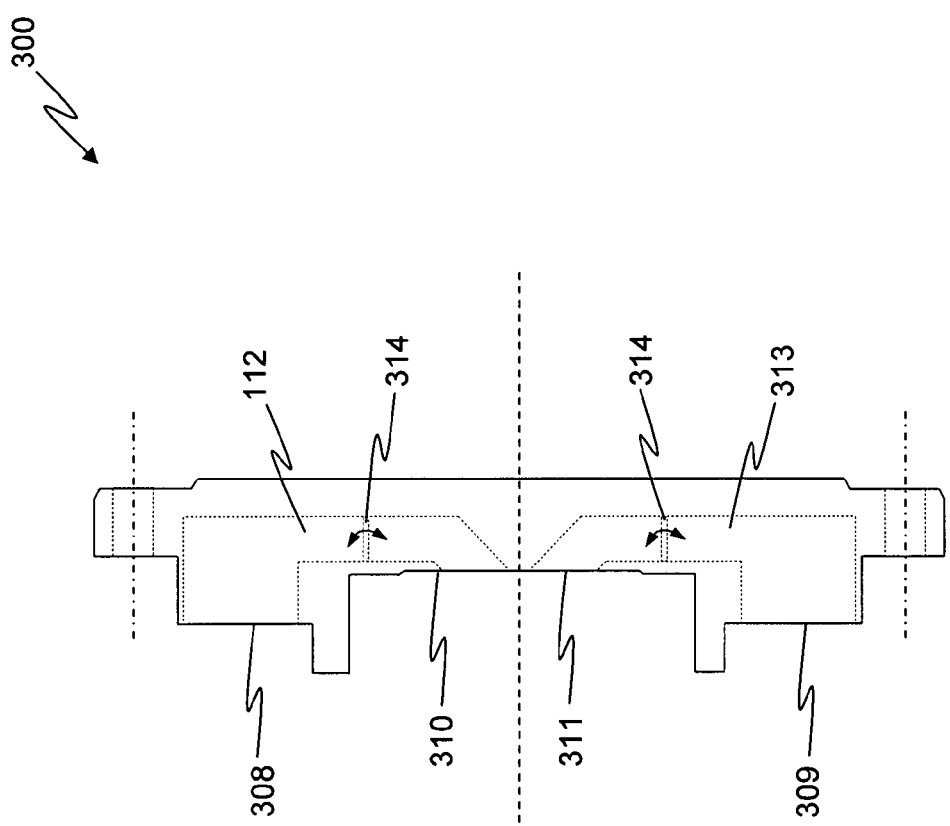
FIG. 8 is a cross sectional side view of a sun pinion cover, in accordance with a third embodiment.

Referring to FIG. 7, a second embodiment of sun pinion cover 200 is shown and includes a plurality of lubricant inlet ports 208, a plurality of lubricant outlet ports 210 and a plurality of lubricant ducts 212, wherein each of the plurality of lubricant inlet ports 108 are communicated with at least one of the plurality of lubricant outlet ports 210 via the plurality of lubricant ducts 212. Moreover, referring to FIG. 8, a third embodiment of sun pinion cover 300 is shown and includes a first lubricant inlet port 308, a second lubricant inlet port 309, a first lubricant outlet port 310 and a second lubricant outlet port 311, wherein the first lubricant inlet port 308 is communicated with the first lubricant outlet port 310 via a first lubricant duct 112 and wherein the second lubricant inlet port 309 is communicated with the second lubricant outlet port 311 via a second lubricant duct 313. It should be appreciated that a directional flow valve 314 may be included and disposed to be communicated with the lubrication duct to control the direction of lubricant flow through the lubrication duct. Moreover, it should also be appreciated that although the sun pinion cover 100 is described herein as being associated with an AC transmission 116 having double reduction gear set 126, it should be appreciated that sun pinion cover 100 may be used with any type of transmission suitable to the desired end purpose.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A sun pinion cover for a motorized wheel off-highway vehicle transmission comprising a high-speed pinion and high-speed planets positioned around the pinion at an inward side of the transmission, a low-speed pinion and low-speed planets positioned around the low-speed pinion at an outward side of the transmission, a transmission housing defining a transmission cavity receiving the pinions and planets, and a transmission opening at a longitudinal axis of the transmission at an outward end of the transmission housing for enabling access to the pinions and planets, wherein the low-speed pinion is of generally tubular construction defining a central passage therein and having an inward thrust washer at one end toward the high-speed pinion and an outward thrust washer toward the transmission opening, the sun pinion cover comprising:

a single-piece cover body structure detachably secured to the transmission housing for covering the transmission opening at the longitudinal axis of the transmission, said cover body structure defining a lubricant duct extending in a generally radial direction with respect to the longitudinal axis of the transmission and presenting a first lubricant port at an inner surface of the cover and a second lubricant port at the inner surface of the cover, with the lubricant duct enabling lubricant flow between the first lubricant port to the second lubricant port, said first lubricant port being positioned adjacent the low-speed planets in the transmission cavity to receive lubricant expelled by the low-speed planets and said second lubricant port being disposed adjacent the low-speed pinion central passage for flow of lubricant from the transmission cavity to the central passage of the low-speed pinion for distributing lubricant to the inward and outward thrust washers on the low-speed pinion; and a flow valve disposed to be communicated with said lubricant duct to control the direction of lubricant flow.

2. The sun pinion cover of claim 1 wherein said lubricant duct comprises a channel in the inner surface of the cover, which is open to the inner surface of the cover along the length of the channel.

3. The sun pinion cover of claim 1, wherein the lubricant duct comprises a passage formed in the cover and spaced from the inner surface of the cover thereof except at the first lubricant port and the second lubricant port.

4. The sun pinion cover of claim 1, further comprising a second lubricant duct, wherein said second lubricant duct includes a third lubricant port and a fourth lubricant port.

5. The sun pinion cover of claim 1, wherein said flow valve is a uni-directional valve disposed to be communicated with said lubricant duct to control the direction of lubricant flow.

6. The sun pinion cover of claim 1, wherein said lubricant duct includes a plurality of passages which communicates said low-speed planets with said low-speed pinion central passage.

7. The sun pinion cover of claim 1, further comprising a connection device for detachably securing the cover to the transmission housing.

8. The sun pinion cover of claim 7, wherein said connection device includes at least one of a bolt, a clip, a snap, a clamp and an adhesive.

9. The sun pinion cover of claim 7, wherein said connection device comprises at least one mounting hole in the cover for securing the sun pinion cover to the transmission housing at the transmission opening.

10. The sun pinion cover of claim 9, further comprising a bolt, wherein said bolt is securingly receiving in the mounting hole in the cover for attachment to the transmission housing.

11. A transmission assembly for an electric motor driven, off-highway vehicle, comprising:
 a transmission housing, wherein said transmission housing defines a transmission cavity and a transmission opening, wherein said transmission opening is communicated with said transmission cavity;
 a reduction gear set, said reduction gear set having a low-speed pinion which defines a pinion cavity, said low-speed pinion being disposed within said transmission cavity to be adjacent said transmission opening; and
 a sun pinion cover, wherein said sun pinion cover includes a single-piece cover body structure which defines a first lubricant opening, a second lubricant opening and a lubricant conduction channel, said lubricant conduction channel communicating said first lubricant opening with said second lubricant opening, and
 a flow valve disposed to be communicated with said lubricant conduction channel to control the direction of lubricant flow,
 wherein said sun pinion cover is associated with said transmission housing such that said sun pinion cover is disposed over said transmission opening and such that said first lubricant opening is communicated with said transmission cavity and such that said second lubricant opening is communicated with said pinion cavity.

12. The transmission assembly of claim 11, wherein said first lubricant opening, said second lubricant opening and said lubricant conduction channel are sized and shaped to maximize said lubricant flow between said transmission cavity and said pinion cavity.

13. The transmission assembly of claim 11, wherein said sun pinion cover is at least partially constructed from at least one of a metallic material, a ceramic material and a composite material.

14. The transmission assembly of claim 11, further including at least one mounting hole for securingly and sealingly associating said sun pinion cover with said transmission housing such that said sun pinion cover is disposed over said transmission opening.

15. The transmission assembly of claim 14, wherein said sun pinion cover is sealingly associated with said transmission housing via a securing device, wherein said securing device is at least one of a bolt, a clip, a snap, a clamp and an adhesive.

16. A method for increasing lubricant flow within an electric-motor driven, off-highway vehicle transmission having a low-speed pinion and a transmission housing structure defining a transmission opening communicated with a transmission cavity, wherein the low-speed pinion defines a pinion cavity and is disposed within the transmission cavity, the method comprising:
 creating a plurality of lubricant conduction paths between the transmission cavity and the pinion cavity, wherein said lubricant conduction paths are created via a sun pinion cover having a single-piece cover body structure;
 operating the electric-motor driven, off-highway vehicle transmission to cause a lubricant to flow between the transmission cavity and the pinion cavity via said lubricant conduction path; and
 controlling the direction of lubricant flow via at least one flow valve disposed to be communicated with said plurality of lubricant conduction paths.

17. A sun pinion cover for an electric-motor driven, off-highway vehicle transmission having a low-speed pinion and a transmission housing structure defining a transmission opening communicated with a transmission cavity, wherein the low-speed pinion is disposed within the transmission cavity and defines a pinion cavity, the sun pinion cover comprising:
 a single-piece cover body structure, said cover body structure having a cover inner surface and defining at least one lubricant conduction channel, wherein said cover inner surface defines a plurality of channel openings communicated with each other via said at least one lubricant conduction channel and wherein when the sun pinion cover is associated with the transmission housing, said plurality of channel openings are disposed to communicated transmission cavity with the pinion cavity to allow for a lubricant flow between the transmission cavity and the pinion cavity, and
 a flow valve disposed to be communicated with said lubricant conduction channel to control the direction of lubricant flow.

* * * * *